US012771638B2

(12) United States Patent
Hu et al.

(10) Patent No.: US 12,771,638 B2
(45) Date of Patent: Oct. 20, 2026

(54) VIDEO DISTRIBUTION CONTROL METHOD, SYSTEM AND APPARATUS, AND STORAGE MEDIUM

(71) Applicant: E SURFING IOT CO., LTD., Guangzhou (CN)

(72) Inventors: Doudou Hu, Guangzhou (CN); Jun Tang, Guangzhou (CN)

(73) Assignee: E SURFING IOT CO., LTD., Guangzhou (CN)

( * ) Notice: Subject to any disclaimer, the term of this patent is extended or adjusted under 35 U.S.C. 154(b) by 233 days.

(21) Appl. No.: 18/695,654

(22) PCT Filed: Dec. 22, 2021

(86) PCT No.: PCT/CN2021/140536

§ 371 (c)(1),
(2) Date: Mar. 26, 2024

(87) PCT Pub. No.: WO2023/050605

PCT Pub. Date: Apr. 6, 2023

(65) Prior Publication Data

US 2024/0406107 A1 Dec. 5, 2024

(30) Foreign Application Priority Data

Sep. 28, 2021 (CN) .......................... 202111144088.0

(51) Int. Cl.
*H04L 45/745* (2022.01)
*H04L 45/00* (2022.01)

(52) U.S. Cl.
CPC ............ *H04L 45/745* (2013.01); *H04L 45/20* (2013.01)

(58) Field of Classification Search
CPC ..... H04L 45/20; H04L 45/745; H04N 21/238; H04N 21/2393; H04N 21/643
See application file for complete search history.

(56) References Cited

U.S. PATENT DOCUMENTS 10,693,791 B2 * 6/2020 Wang ................ H04L 45/74591
11,570,278 B1 * 1/2023 Uthaman ............ H04L 41/0894
(Continued)

FOREIGN PATENT DOCUMENTS

CN 103166859 A 6/2013
CN 103947164 A 7/2014
(Continued)

OTHER PUBLICATIONS

Office Action in CN 2021111440880, dated May 16, 2022, 11 pages.
International Search Report and Written Opinion for PCT/CN2021/140536, dated Jun. 28, 2022.

*Primary Examiner* — Jason D Recek
(74) *Attorney, Agent, or Firm* — Quarles & Brady LLP

(57) ABSTRACT

A video distribution control method, system and apparatus, and a storage medium are disclosed. The video distribution control method includes: distributing distributed information; calculating a routing information table according to link information and video request information; generating a forwarding information table according to the routing information table; and performing video distribution according to the forwarding information table. According to the present disclosure, link information and video request information are distributed by means of distributed control, enabling high-speed local decision-making and real-time response, thereby improving the response speed to video distribution, and avoiding delays caused by calculation of centralized control. A global routing information table is generated by means of centralized control, and combined with distributed control, the routing information table is converted into a forwarding information table, achieving high-quality video distribution services. The present disclosure can be widely applied to the field of video communications.

8 Claims, 4 Drawing Sheets

(56) References Cited

U.S. PATENT DOCUMENTS

| | | | | |
|---|---|---|---|---|
| 11,646,962 | B1 * | 5/2023 | Kwon | H04L 45/16 370/254 |
| 2015/0188731 | A1 | 7/2015 | Daly | |

FOREIGN PATENT DOCUMENTS

| | | | |
|---|---|---|---|
| CN | 105847159 | A | 8/2016 |
| CN | 106304229 | A | 1/2017 |
| CN | 106385641 | A | 2/2017 |
| CN | 106789648 | A | 5/2017 |
| CN | 106899501 | A | 6/2017 |

* cited by examiner

VIDEO DISTRIBUTION CONTROL METHOD, SYSTEM AND APPARATUS, AND STORAGE MEDIUM

CROSS-REFERENCE TO RELATED APPLICATIONS

This application is a national stage filing under 35 U.S.C. § 371 of international application number PCT/CN2021/140536, filed Dec. 22, 2021, which claims priority to Chinese patent application No. 2021111440880 filed Sep. 28, 2021. The contents of these applications are incorporated herein by reference in their entirety.

TECHNICAL FIELD

The present disclosure relates to the field of video communications, and in particular to a video distribution control method, system and apparatus, and a storage medium.

BACKGROUND

With the explosive growth of the live streaming video industry, there has been a fundamental shift in demand for internet video distribution. Given the diversity and vast quantity of live streaming videos, this has posed significant and intricate challenges for cloud storage systems.

Cloud storage systems catering to live streaming video distribution not only need to meet users' demands for fast connection times, high bitrates, and low latency but also minimize the costs associated with distribution and real-time response. However, problems such as wide-area network latency, packet loss, node errors, and the diversity of video loads make these demands highly challenging.

To address this problem, traditional methods have relied on Content Delivery Network (CDN) systems. However, in order to achieve rapid fault handling in wide-area networks, CDN systems have forsaken centralized control, resulting in only coarse-grained video services. They are unable to provide precise control over individual video streams, thus failing to simultaneously meet users' demands for both the practicality and real-time delivery of video distribution, thereby limiting the user experience.

SUMMARY

The objective of the present disclosure is to solve one of the technical problems in the existing technology to at least a certain extent.

To this end, one objective of embodiments of the present disclosure is to provide a video distribution control method which is based on a hybrid control method of distributed control and centralized control, taking into account real-time video distribution response and refined video services.

Another objective of the embodiments of the present disclosure is to provide a video distribution control system.

In order to achieve the above technical objectives, the technical solutions adopted by the embodiments of the present disclosure are provided as follows.

In a first aspect, an embodiment of the present disclosure provides a video distribution control method, including:

distributing distributed information, the distributed information including link information and video request information;

calculating a routing information table according to the link information and the video request information;

generating a forwarding information table according to the routing information table; and performing video distribution according to the forwarding information table.

According to the video distribution control method provided in an embodiment of the present disclosure, link information and video request information are distributed by means of distributed control, enabling high-speed local decision-making, thereby improving the response speed to video distribution, and avoiding delays caused by calculation of centralized control. A global routing information table is generated by means of centralized control, providing high-quality video distribution services.

In addition, the video distribution control method according to the embodiment of the present disclosure may also have the following additional technical features.

Further, in the video distribution control method provided in an embodiment of the present disclosure, the distributing distribution information includes:

setting initial states of clusters for video distribution, and obtaining a distance vector protocol for video distribution;

generating the distributed information according to the initial states; and distributing the distributed information among the clusters according to the distance vector protocol.

Further, in the embodiment of the present disclosure, the distributing the distributed information among the clusters according to the distance vector protocol further includes:

periodically transmitting a network state of each of the clusters to adjacent clusters, the network state including video data and a bit rate;

calculating, according to the network state, a hop count required for video distribution; and distributing the distributed information among the clusters according to the hop count.

Further, in an embodiment of the present disclosure, the calculating a routing information table according to the link information and the video request information includes:

calculating configuration information of a distributed control tree according to the link information and the video request information;

generating hybrid decision-making information according to the configuration information, the hybrid decision-making information being used to authorize execution of the distributed control tree; and obtaining the routing information table according to the configuration information of the distributed control tree and the hybrid decision-making information.

Further, in an embodiment of the present disclosure, the video distribution control method further includes:

generating DNS information according to a user's geographical characteristics;

distributing the DNS information to each of the clusters; and mapping an autonomous system to the corresponding clusters according to the DNS information, the autonomous system being used to determine a routing protocol for video distribution.

Further, in an embodiment of the present disclosure, the generating a forwarding information table according to the routing information table includes:

generating distributed control decisions according to the hybrid decision-making information; and generating the forwarding information table in combination with the routing information table and the distributed control decisions.

Further, in an embodiment of the present disclosure, the video distribution control method further includes:

handling faults through the clusters; and updating the routing information table for the faults.

In a second aspect, an embodiment of the present disclosure provides a video distribution control system, including:

a distributed information distribution module, configured to distribute distributed information;

a routing information table calculation module, configured to calculate a routing information table according to link information and video request information;

a forwarding information table generation module, configured to generate a forwarding information table according to the routing information table; and a video distribution module, configured to perform video distribution according to the forwarding information table.

In a third aspect, an embodiment of the present disclosure provides a video distribution control apparatus, including:

at least one processor;

at least one memory for storing at least one program;

wherein the at least one program, when executed by the at least one processor, causes the at least one processor to implement the above video distribution control method.

In a fourth aspect, an embodiment of the present disclosure provides a storage medium, storing a processor-executable program, the processor-executable program, when executed by a processor, implements the above video distribution control method.

The advantages and beneficial effects of the present disclosure will be set forth in part in the description which follows, and in part will be apparent from the description, or may be learned through practice of the present disclosure.

In the embodiments of the present disclosure, link information and video request information are distributed by means of distributed control, enabling high-speed local decision-making and real-time response, thereby improving the response speed to video distribution, and avoiding delays caused by calculation of centralized control. A global routing information table is generated by means of centralized control, and combined with distributed control, the routing information table is converted into a forwarding information table, achieving high-quality video distribution services.

BRIEF DESCRIPTION OF DRAWINGS

In order to more clearly illustrate the technical solutions in the embodiments of the present disclosure or the existing technology, the following description of the relevant technical solutions in the embodiments of the present disclosure or the existing technology with accompanying drawings is given as follows. It should be understood that the accompanying drawings in the following introduction are only intended to facilitate the clearly presentation of some of the embodiments of the technical solutions of the present disclosure, and those of ordinary skills in the art can also obtain other accompanying drawings based on these accompanying drawings without creative efforts.

DETAILED DESCRIPTION

Figure 1:
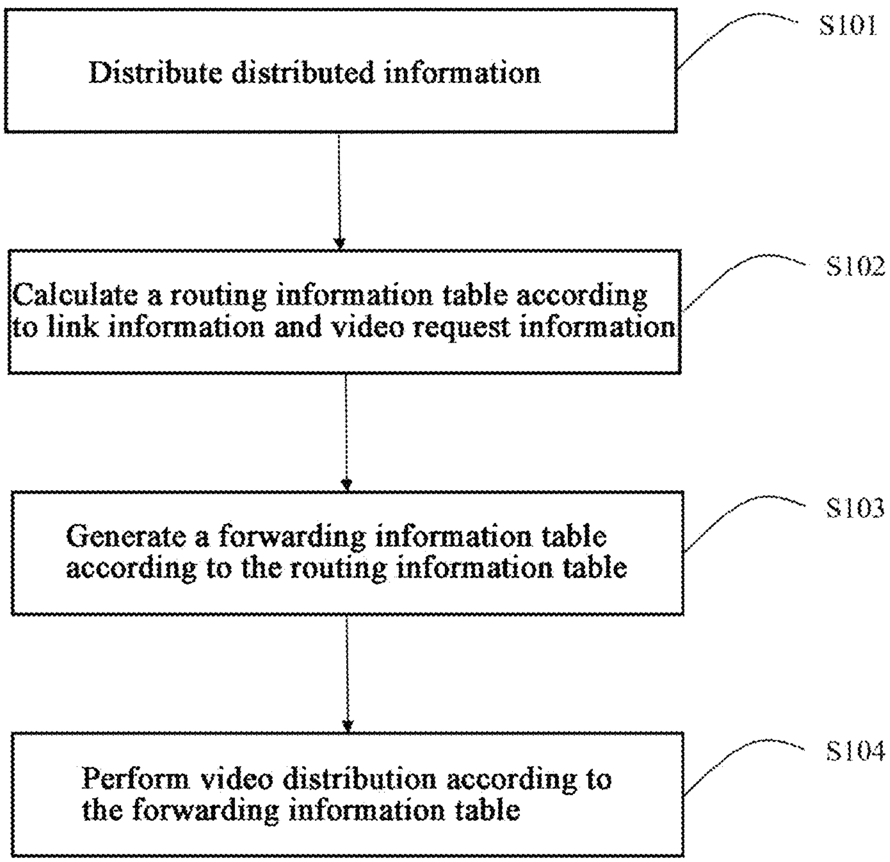
FIG. 1 is a schematic flowchart of a video distribution control method according to an embodiment of the present disclosure.

Embodiments of the present disclosure are described in detail below, examples of which are illustrated in the accompanying drawings. Same or similar reference numerals throughout represent the same or similar elements or elements with the same or similar functions. The embodiments described below with reference to the accompanying drawings are exemplary and are only used to explain the present disclosure and cannot be understood as limiting the present disclosure. The step numbers in the following embodiments are only set for the convenience of explanation. The order between the steps is not limited in any way. The execution order of various steps in the embodiments can be adaptively adjusted according to the understanding of those of ordinary skills in the art.

The terms "first", "second", "third" and "fourth" in the description, claims and accompanying drawings of the present disclosure are used to distinguish different objects, rather than describing a specific sequence. Furthermore, the terms "comprising" and "having" and any variations thereof are intended to cover non-exclusive inclusion. For example, processes, methods, systems, products or devices that include a series of steps or units are not limited to the listed steps or units, but optionally also include unlisted steps or units, or optionally also include other steps or units inherent to such processes, methods, products or devices.

Reference in the present disclosure to "an embodiment" means that a particular feature, structure or characteristic described in conjunction with the embodiment may be included in at least one embodiment of the present disclosure. The appearances of this phrase in various places in the specification do not necessarily all refer to the same embodiment, nor are separate or alternative embodiments mutually exclusive of other embodiments. Those of ordinary skills in the art understand, both explicitly and implicitly, that the embodiments described herein may be combined with other embodiments.

With the explosive growth of the live streaming video industry, there has been a fundamental shift in demand for internet video distribution. Given the diversity and vast quantity of live streaming videos, this has posed significant and intricate challenges for cloud storage systems. Cloud storage systems catering to live streaming video distribution not only need to meet users' demands for fast connection times, high bitrates, and low latency but also minimize the costs associated with distribution and real-time response. However, problems such as wide-area network latency, packet loss, node errors, and the diversity of video loads make these demands highly challenging.

To address this problem, traditional methods have relied on Content Delivery Network (CDN) systems. However, in order to achieve rapid fault handling in wide-area networks, CDN systems have forsaken centralized control, resulting in only coarse-grained video services. They are unable to provide precise control over individual video streams, thus failing to simultaneously meet users' demands for both the practicality and real-time delivery of video distribution, thereby limiting the user experience.

To this end, the present disclosure provides a video distribution control method and system. Unlike traditional video distribution control methods which have the problem of forsaking centralized control, according to the present disclosure, link information and video request information are distributed by means of distributed control, enabling high-speed local decision-making and real-time response, thereby improving the response speed to video distribution, and avoiding delays caused by calculation of centralized control. A global routing information table is generated by means of centralized control, and combined with distributed control, the routing information table is converted into a forwarding information table, achieving high-quality video distribution services.

A video distribution control method and system provided according to embodiments of the present disclosure will be described in detail below with reference to the accompanying drawings. First, a video distribution control method provided according to an embodiment of the present disclosure will be described with reference to the accompanying drawings.

Referring to FIG. 1, an embodiment of the present disclosure provides a video distribution control method. The video distribution control method in an embodiment of the present disclosure may be applied to a terminal or a server, and may also run on the software in the terminal or server. The terminal may be a tablet computer, a laptop computer, a desktop computer, etc., but is not limited thereto. The server may be a standalone physical server, or a server cluster or distributed system composed of multiple physical servers, or a cloud server that provides cloud services, cloud databases, cloud computing, cloud functions, cloud storage, network services, cloud communications, middleware services, domain services, security services, CDN, and big data and artificial intelligence platforms. The video distribution control method in an embodiment of the present disclosure mainly includes the following steps.

At S101, distributed information is distributed.

Specifically, the distributed information includes link information and video request information, where the distribution of the distributed information is based on distributed control, realizing local distribution and processing of the link information and the video request information, and enabling quick response to video distribution demands.

Figure 5:
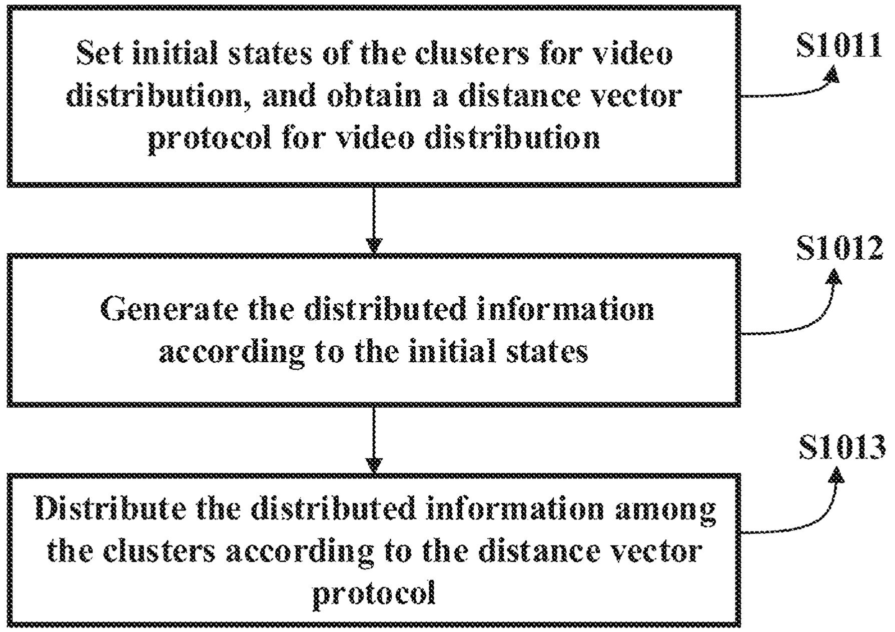
FIG. 5 is a schematic flowchart of a video distribution control method according to an embodiment of the present disclosure.

S101 may be further divided into the following steps S1011-S1013, as shown in FIG. 5.

At S1011, initial states of clusters for video distribution are set, and a distance vector protocol for video distribution is obtained.

Specifically, the cluster acts as a distributed control node, which can realize the distribution of video distribution tasks and facilitate transfer when the server fails. The initial states of the clusters are the initial states of multiple adjacent clusters.

With regard to the distance vector protocol, that is, a distance vector routing protocol, in an embodiment of the present disclosure, the cluster will send a network state to the adjacent cluster periodically (for example, 30 seconds). The distance vector protocol uses the hop count as a metric to calculate the hop count required for video distribution or information transmission between clusters, that is, the number of routers on a distribution path.

At S1012, the distributed information is generated according to the initial states.

At S1013, the distributed information is distributed among the clusters according to the distance vector protocol.

Specifically, the cluster distributes the video request information and link information to other clusters by means of the distance vector protocol.

This step includes the following steps:

(1) Periodically Transmitting the Network State of the Cluster to the Adjacent Cluster.

Specifically, the network state connected to the cluster includes a video and a bit rate. The video and bit rate information are represented by s(v, b), which is used to represent connecting a cluster to a video v according to the bit rate b, and obtaining the hop count required by the video from the adjacent cluster according to the distance vector protocol. The information transmitting method between clusters is to send information to the nearest adjacent cluster.

(2) Calculating, According to the Network State, a Hop Count Required for Video Distribution.

Specifically, according to s(v, b) in step (1), the hop count required for video distribution is calculated. In an embodiment of the present disclosure, if a cluster has been connected to the video v according to the bit rate b, then for the cluster, s(v, b)=0.

(3) Distributing the Distributed Information Among the Clusters According to the Hop Count.

The distributed information is distributed among the clusters according to the hop count calculated in step (2).

At S102, a routing information table is calculated according to the link information and the video request information;

Specifically, the routing information table is calculated using centralized control. Based on distributed control, centralized control involves collecting distributed information from each cluster and calculating the optimal distributed control tree with a global view.

The routing information table is a spreadsheet or a class database stored in a router or a networked computer. In an embodiment of the present disclosure, the optimal distributed control tree path is stored in the routing information table. It is understandable that in a computer network, the main job of a router is to find an optimal transmission path for each data packet passing through the router, and to effectively deliver the data packet to the destination. In order to select the optimal transmission path from numerous paths, the router saves topology information of the surrounding network and various path parameters in a table, which is the routing information table.

Figure 6:
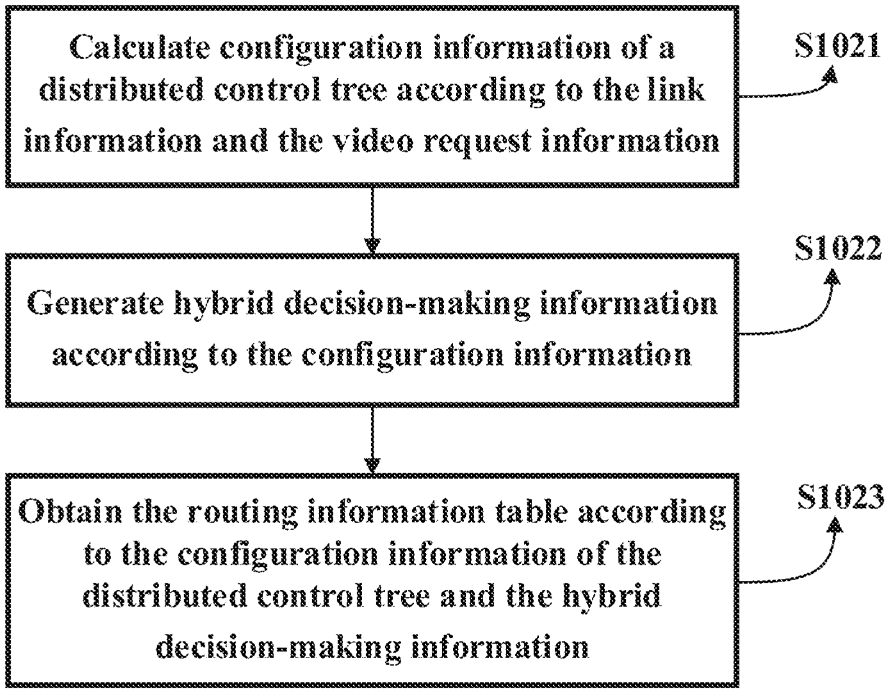
FIG. 6 is a schematic flowchart of a video distribution control method according to an embodiment of the present disclosure.

S102 may be further divided into the following steps S1021-S1023, as shown in FIG. 6.

At S1021, configuration information of a distributed control tree is calculated according to the link information and the video request information.

Specifically, a global network view is established according to the link information and the video request information collected from various clusters, and the configuration information of the optimal distributed control tree is calculated based on the global view. The distributed control tree is used for decision-making routing. To prevent single-point errors during the computation, multiple synchronously replicated centralized controls can be used.

At S1022, hybrid decision-making information is generated according to the configuration information.

Specifically, the hybrid decision-making information is used to authorize execution of routing decisions in the distributed control tree.

At S1023, the routing information table is obtained according to the configuration information of the distributed control tree and the hybrid decision-making information.

Specifically, in an embodiment of the present disclosure, the routing information table stores the optimal distributed control tree path and the hybrid decision-making information authorizing the execution of the distributed control tree.

The video distribution control method provided in an embodiment of the present disclosure also includes the following steps:

(1) generating Domain Name System (DNS) information according to a user's geographical characteristics;

(2) distributing the DNS information to each of the clusters; and (3) mapping an autonomous system (AS) to the corresponding clusters according to the DNS information.

Specifically, the AS is used to determine a routing protocol for distributed control-based video distribution. Compared with traditional CDN, the DNS information used in an embodiment of the present disclosure takes into account the geographical characteristics of the user. The DNS information maps the AS to the corresponding clusters by means of calculation based on centralized control. In an embodiment of the present disclosure, if the AS cannot be mapped to the corresponding clusters for the DNS information corresponding to video request information, a hierarchical method is used to generate an initial distribution. Specifically, the AS is distributed to a cluster that processes the video request information or a cluster using this AS.

At S103, a forwarding information table is generated according to the routing information table.

Specifically, the forwarding information table is used for video distribution. After centralized control calculates and generates the routing information table according to the distributed information of distributed control, the routing information table is transmitted to the clusters based on distributed control. The clusters for video distribution generate the forwarding information table for video distribution according to the routing information table.

Corresponding to the decision routing function of the routing information table, the function of the forwarding information table is to perform forwarding according to the routing decision of the packet routing information table. It can be seen according to step S1023, in an embodiment of the present disclosure, that the routing information table stores the optimal distributed control tree path and the hybrid decision-making information authorizing the execution of the distributed control tree. The forwarding information table stores the routes corresponding to the optimal paths for video distribution to different clusters. It can be seen according to steps S1011 and S1013 that the optimal path represents the path with the minimum hop count required for video distribution among different clusters (the path with the least number of routers traversed).

Figure 7:
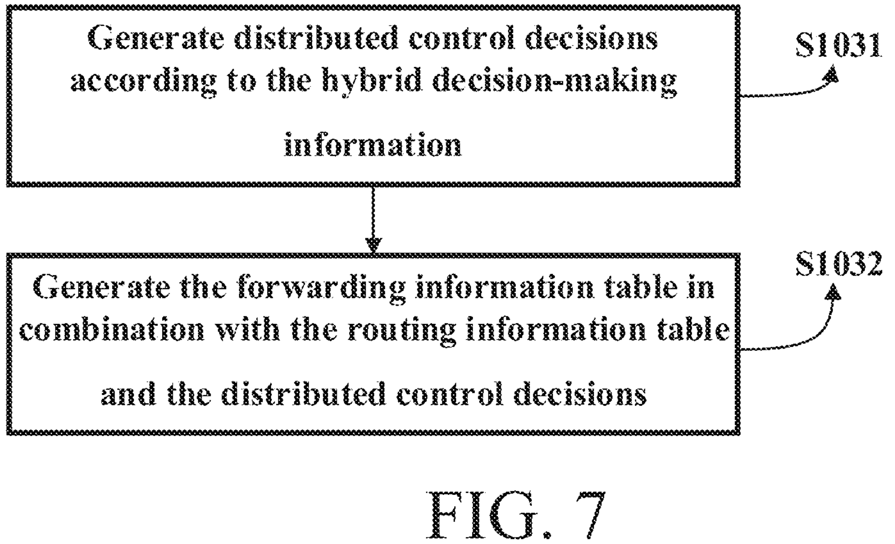
FIG. 7 is a schematic flowchart of a video distribution control method according to an embodiment of the present disclosure.

S103 may be further divided into the following steps S1031-S1032, as shown in FIG. 7.

At S1031, distributed control decisions are generated according to the hybrid decision-making information.

Specifically, it can be seen according to step S1022 that the hybrid decision-making information is used to authorize execution of routing decisions within the distributed control tree. The video distribution cluster based on distributed control generates distributed control decisions according to the hybrid decision-making information, so as to execute routing decisions within the distributed control tree.

At S1032, the forwarding information table is generated in combination with the routing information table and the distributed control decisions.

Specifically, the routing information table is processed according to the distributed control decisions, and the forwarding information table that stores routing data on the optimal path for video distribution to different clusters is generated.

The video distribution control method provided in an embodiment of the present disclosure further includes the following steps:

(1) handling faults through the clusters; and (2) updating the routing information table according to the faults.

Specifically, in the event of a fault occurring during the execution of video distribution, the real-time response of the clusters based on distributed control is used to quickly feedback the fault. The routing information table is recalculated for the fault by the centralized control, and the updated fault information table is disseminated to all clusters to obtain a new forwarding information table.

At S104, video distribution is performed according to the forwarding information table.

Specifically, it can be seen according to S103 that the forwarding information table stores routes corresponding to the optimal path for video distribution to different clusters. The optimal path represents the path with the minimum hop count required for video distribution among different clusters (the least number of routers traversed). According to the forwarding information table, each cluster performs video distribution by means of the optimal path, and due to the real-time and efficient nature of distributed control, it is able to quickly respond to users' demands for video distribution.

Figure 2:
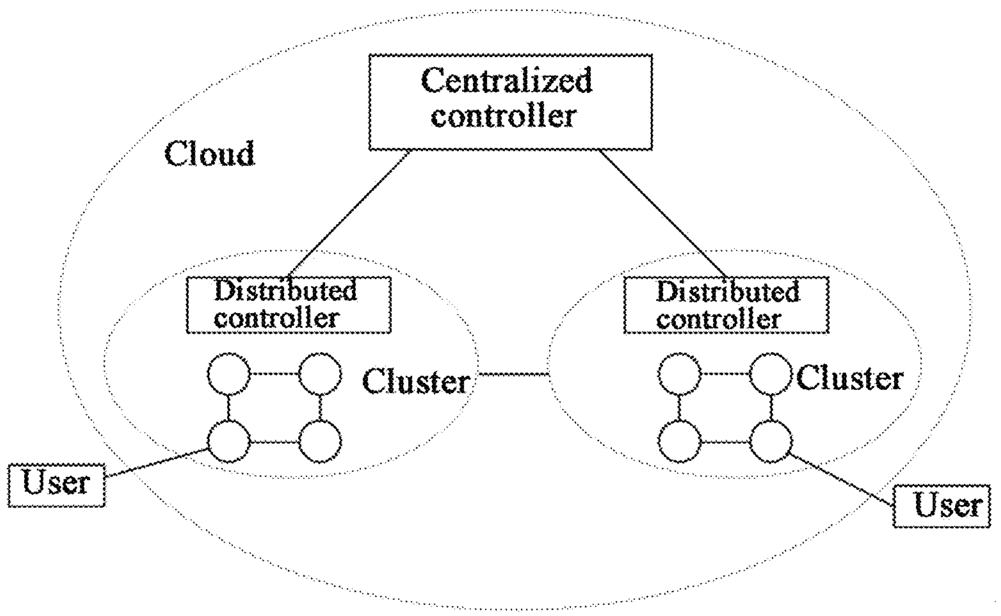
FIG. 2 is an architectural schematic diagram of a video distribution control method according to an embodiment of the present disclosure.

Referring to FIG. 2, the video distribution control method provided in an embodiment of the present disclosure is based on global management of centralized control, provides high-quality video streams, and forms a flexible and sensitive video distribution architecture in combination with distributed control, enabling real-time and fine handling of video distribution services.

Secondly, a video distribution control system provided according to an embodiment of the present disclosure is described with reference to the accompanying drawings.

Figure 3:
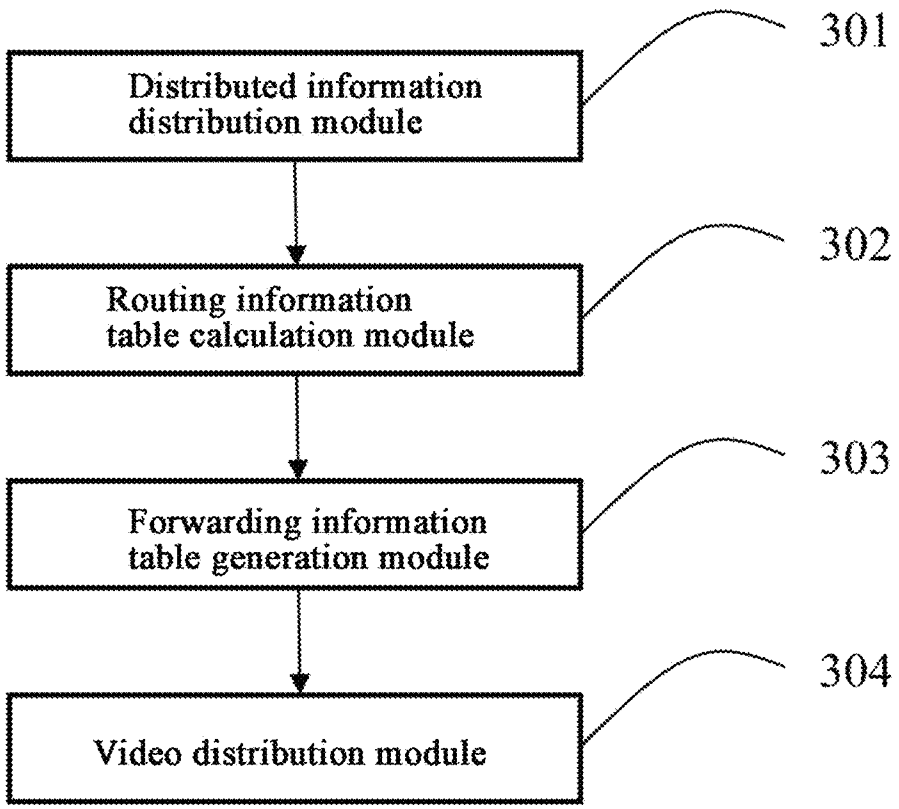
FIG. 3 is a schematic structural diagram of a video distribution control system according to an embodiment of the present disclosure.

FIG. 3 is a schematic structural diagram of a video distribution control system according to an embodiment of the present disclosure.

The system specifically includes:

a distributed information distribution module 301, configured to distribute distributed information;

a routing information table calculation module 302, configured to calculate a routing information table according to link information and video request information;

a forwarding information table generation module 303, configured to generate a forwarding information table according to the routing information table; and a video distribution module 304, configured to perform video distribution according to the forwarding information table.

It can be seen that the contents in the above-mentioned method embodiments are all applicable to this system embodiment. The specific functions implemented by this system embodiment are the same as those in the above-mentioned method embodiments, and the beneficial effects achieved are also the same as those achieved by the above-mentioned method embodiments.

Figure 4:
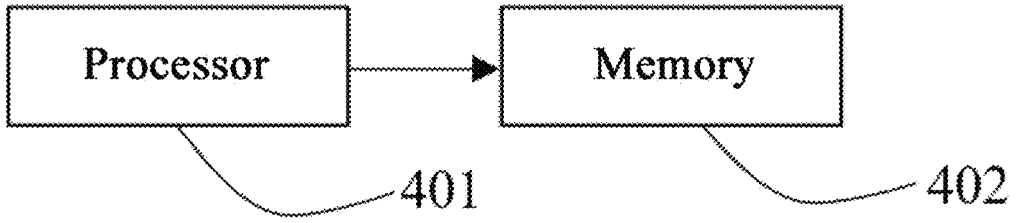
FIG. 4 is a schematic structural diagram of a video distribution control apparatus according to an embodiment of the present disclosure.

Referring to FIG. 4, an embodiment of the present disclosure provides a video distribution control apparatus, including:

at least one processor 401;

at least one memory 402 for storing at least one program;

wherein the at least one program, when executed by the at least one processor 401, causes the at least one processor 401 to implement the video distribution control method.

Similarly, the contents in the above method embodiments are applicable to this apparatus embodiment. The specific functions implemented by this apparatus embodiment are the same as those in the above method embodiments, and the beneficial effects achieved are the same as those achieved by the above method embodiments.

In some optional embodiments, the functions/operations mentioned in the block diagrams may occur out of the order noted in the operational illustrations. For example, two blocks consecutively illustrated may in fact be executed substantially concurrently or the blocks may sometimes be executed in the reverse order, depending on the functionality/operations involved. Furthermore, the embodiments presented and described in the flowcharts of the present disclosure are provided by way of example for the purpose of providing a more comprehensive understanding of the technology. The disclosed methods are not limited to the operations and logical processes presented herein. Optional embodiments are to be expected, where the order of various operations is changed and sub-operations described as part of a larger operation are performed independently.

Furthermore, although the present disclosure is described in the context of functional modules, it should be understood that, unless otherwise indicated to the contrary, one or more functions and/or features may be integrated in a single physical device and/or software module, or one or more functions and/or features may be implemented in separate physical devices or software modules. It will also be understood that a detailed discussion regarding the actual implementation of each module is not necessary for understanding the present disclosure. More precisely, the actual implementation of the various functional modules in the apparatus disclosed herein will be within the ordinary skill of an engineer, taking into account the properties, functions and internal relationships of the modules. Therefore, those of ordinary skills in the art using ordinary skills would be able to implement the present disclosure as set forth in the claims without undue experimentation. It will also be understood that the specific concepts disclosed are illustrative only and are not intended to limit the scope of the present disclosure, which is to be determined by the full scope of the appended claims and their equivalents.

The functions may be stored in a computer-readable storage medium when implemented in the form of a software functional unit and sold or used as an independent product. Based on this understanding, the technical solution of the present disclosure may be embodied in the form of a software product, which is essentially or in part a contribution to the existing technology, or part of the technical solution may be embodied in the form of a software product. The computer software product is stored in a storage medium, and includes several programs to enable a computer device (which may be a personal computer, a server, or a network device, etc.) to execute all or part of the steps of the methods described in various embodiments of the present disclosure. The above-mentioned storage medium may include: a USB flash drive, a mobile hard disk, a read-only memory (ROM), a random access memory (RAM), a magnetic disk or an optical disk and other media that may store program code.

The logic and/or steps represented in the flowcharts or otherwise described herein, for example, may be considered a sequenced listing of an executable program for implementing the logical functions, and may be embodied in any computer-readable medium for use by program execution systems, apparatuses or devices (such as computer-based systems, systems including processors or other systems that may retrieve programs from program execution systems, apparatuses or devices and execute the programs), or in combination with such program execution systems. In this specification, a "computer-readable medium" may be any device that may contain, store, communicate, propagate, or transmit a program for use by or in combination with a program execution system, device, or apparatus.

More specific examples (non-exhaustive list) of computer-readable media include the following: an electrical connection part (electronic device) with one or more wires, a portable computer disk cartridge (magnetic device), a random access memory (RAM), a read-only memory (ROM), an erasable programmable read only memory (EPROM or flash memory), a fiber optic device, and a portable compact disc read-only memory (CDROM). Additionally, a computer-readable medium may even be paper or other suitable medium on which the program may be printed, since the program can be obtained electronically, for example, by optically scanning the paper or other medium, followed by editing, decoding or, if necessary, processing in other suitable ways, and then storing it in a computer memory.

It should be understood that various parts of the present disclosure may be implemented in hardware, software, firmware, or combinations thereof. In the above embodiments, various steps or methods may be implemented in software or firmware stored in a memory and executed by a suitable program execution system. For example, if implemented in hardware, as in another embodiment, it may be implemented by any or combinations of the following technologies known in the art: discrete logic circuits with logic gates for implementing logical functions on data signals, application specific integrated circuits with suitable combinational logic gates, programmable gate arrays (PGAs), field programmable gate arrays (FPGAs), etc.

In the above description of this specification, the description with reference to the terms "an embodiment/example", "another embodiment/example" or "some embodiments/examples" etc. means that specific features, structures, materials or characteristics described in combination with the embodiments or examples are included in at least one embodiment or example of the present disclosure. In this specification, schematic representations of the above terms do not necessarily refer to the same embodiment or example. Furthermore, the specific features, structures, materials or characteristics described may be combined in any suitable manner in any one or more embodiments or examples.

Although embodiments of the present disclosure have been shown and described, those of ordinary skill in the art will understand that various changes, modifications, substitutions and variations can be made to these embodiments without departing from the principles and purposes of the present disclosure, and the scope of the present disclosure is limited by the claims and their equivalents.

The above is a detailed description of the preferred embodiments of the present disclosure, but the present disclosure is not limited to the embodiments. Those of ordinary skills in and familiar with the art may also make various equivalent modifications or substitutions without violating the gist of the present disclosure. These equivalent modifications or substitutions are all included within the scope limited by the claims of the present disclosure.

What is claimed is:

1. A video distribution control method based on a hybrid control method of distributed control and centralized control, comprising:
- distributing distributed information among clusters by means of the distributed control, wherein the distributed information comprises link information and video request information;
- calculating a global routing information table by means of the centralized control according to the link information and the video request information;
- generating a forwarding information table according to the routing information table; and
- performing video distribution according to the forwarding information table;
- wherein the calculating a global routing information table by means of the centralized control according to the link information and the video request information comprises:
  - calculating configuration information of a distributed control tree according to the link information and the video request information from each of the clusters. wherein the distributed control tree is configured for decision-making routing;
  - generating hybrid decision-making information according to the configuration information, the hybrid decision-making information being used to authorize execution of the distributed control tree; and
  - obtaining the routing information table according to the configuration information of the distributed control tree and the hybrid decision-making information.

2. The video distribution control method according to claim 1, wherein the distributing distributed information comprises:
- setting initial states of the clusters for video distribution, and obtaining a distance vector protocol for video distribution;
- generating the distributed information according to the initial state; and
- distributing the distributed information among the clusters according to the distance vector protocol.

3. The video distribution control method according to claim 2, wherein the distributing the distributed information among the clusters according to the distance vector protocol further comprises:
- periodically transmitting a network state of each of the clusters to adjacent clusters, the network state comprising video data and a bit rate;
- calculating, according to the network state, a hop count required for video distribution; and
- distributing the distributed information among the clusters according to the hop count.

4. The video distribution control method according to claim 2, further comprising the following steps:
- generating DNS information according to a user's geographical characteristics;
- distributing the DNS information to each of the clusters; and
- mapping an autonomous system to the corresponding clusters according to the DNS information, the autonomous system being used to determine a routing protocol for video distribution.

5. The video distribution control method according to claim 1, wherein the generating a forwarding information table according to the routing information table comprises:
- generating distributed control decisions according to the hybrid decision-making information; and
- generating the forwarding information table in combination with the routing information table and the distributed control decisions.

6. The video distribution control method according to claim 2, further comprising the following steps:
- handling faults through the clusters; and
- updating the routing information table for the faults.

7. A video distribution control apparatus, comprising:
- at least one processor;
- at least one memory for storing at least one program;
- wherein the at least one program, when executed by the at least one processor, causes the at least one processor to implement the video distribution control method as claimed in claim 1.

8. A non-transitory computer-readable storage medium, storing a processor-executable program, wherein the processor-executable program, when executed by a processor, implements the video distribution control method as claimed in claim 1.

* * * * *